April 20, 1926.

E. B. BEELER 1,581,420

SLED RUNNER FOR COASTERS

Filed March 30, 1925

INVENTOR
E. B. BEELER
BY Munn & Co.
ATTORNEYS

Patented Apr. 20, 1926.

1,581,420

UNITED STATES PATENT OFFICE.

ESTEN BURLEIGH BEELER, OF CHICAGO, ILLINOIS, ASSIGNOR TO SIMON J. HARBAUGH, OF CHICAGO, ILLINOIS.

SLED RUNNER FOR COASTERS.

Application filed March 30, 1925. Serial No. 19,348.

*To all whom it may concern:*

Be it known that I, ESTEN B. BEELER, a citizen of the United States, and a resident of Chicago, in the county of Cook and State of Illinois, have invented a new and useful Improvement in Sled Runners for Coasters, of which the following is a full, clear, and exact description.

My invention relates to improvements in sled runners for coaster wagons, and it consists in the constructions, combinations, and arrangements herein described and claimed.

An object of my invention is to provide a runner which may be instantly attached to or detached from a wheel such as the rubber tired wheels in common use on small wagons, gocarts, baby carriages, and wheeled coasters.

A further object of my invention is to provide an attachable and detachable sled runner which does not require the use of additional clamping mechanism to firmly hold it in position, but which by its inherent construction may be quickly applied to or detached from a wheel.

A further object of my invention is to provide a runner of the type described which may be used to change any wheeled vehicle of the types mentioned above into a sled so that the use of the vehicle may be prolonged through the winter season.

A further object of my invention is to provide a sled runner which can be manufactured at a low cost.

Other objects and advantages will appear in the following specification, and the novel features of the invention will be particularly pointed out in the appended claim.

My invention is illustrated in the accompanying drawings, forming a part of this application in which—

Figure 1:
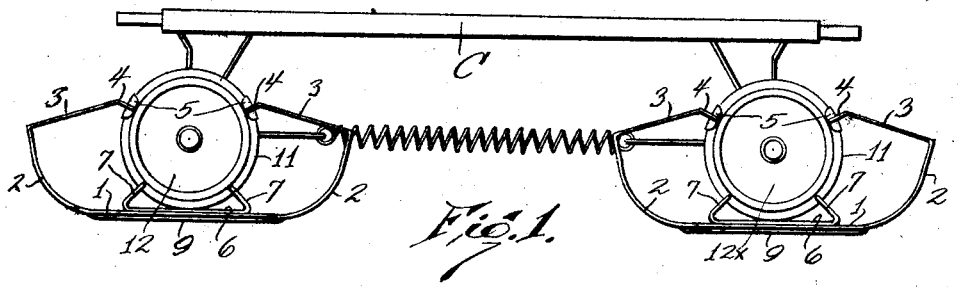
Figure 2:
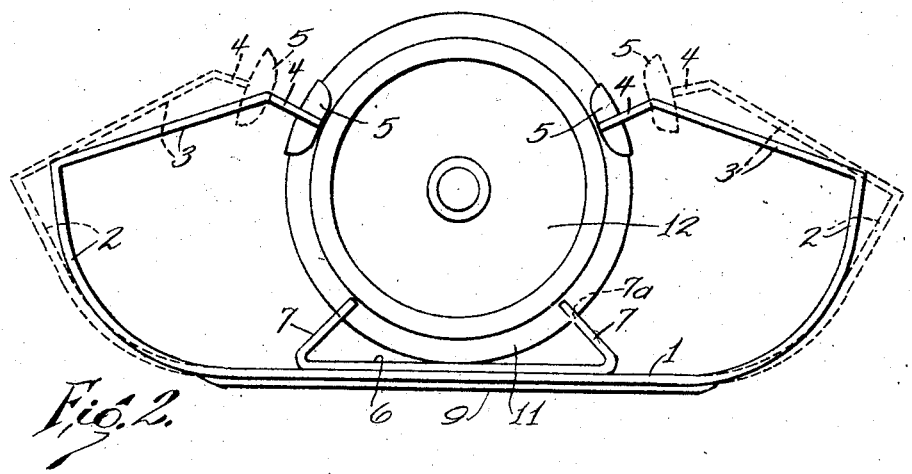
Figure 3:
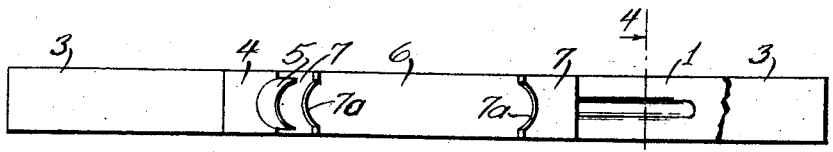
Figure 4:
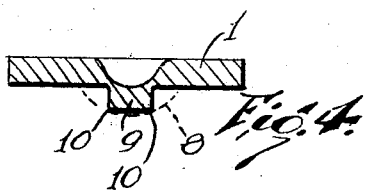

Figure 1 is a side view of a coaster wagon (the latter forming the subject of a separate application) equipped with my improved sled runner, Figure 2 is an enlarged side view showing the application of the sled runner to a single wheel, Figure 3 is a plan view of the parts shown in Figure 2, the wheel being removed and a portion of the runner being broken away to illustrate the construction, and Figure 4 is an enlarged section along the line 4—4 of Figure 3.

In carrying out my invention I make use of a strip of metal, preferably steel. As will be seen from the drawings, this consists of a body portion 1 which is curved at each end, as indicated at 2, then is bent back upon itself as shown at 3, and thence downwardly as at 4. The portions 4 are provided with arc shaped shoes 5. Secured to the portion 1 on the upper side thereof is a strip of metal 6 having ends 7 which are bent upwardly and inwardly.

In order to provide a sharp bearing portion similar to the lower edge of a skate, I preferably stamp the body portion 1 so as to provide a bead which is indicated in dotted lines at 8 (see Figure 4). This bead is then milled so as to leave a tongue or ridge 9 having sharp corners 10. The upwardly and inwardly turned ends 7 of the strip 6 are recessed to receive the tire 11 of the wheel 12. The strip 6 may be secured to the body portion 1 by riveting or in any other suitable manner.

From the foregoing description of the various parts of the device, the operation thereof may be readily understood. The sled runners are designed to be made in sizes to correspond with various sized wheels, and the parts 4 and 7 are designed to extend toward the center of the wheel upon which the runner is secured. All that is necessary to secure the runner to the wheel is to spring the portions bearing the shoes 5 outwardly as shown in dotted lines, slip the runner over the wheel, and release the parts, thereby permitting them to take the position shown in Figure 2. In this position it will be observed that the bottom of the wheel rests on the strip 6, that the tire 11 is held by the recesses 7$^a$ in the ends of the members 7, and that the shoes 5 grip the tire on opposite sides and above the center. The purpose of the shoes 5 is to prevent undue wear of the tire.

In Figure 1 I have shown the coaster wagon C as having the sled runners applied to the front wheel 12 and the rear wheel 12$^x$. It is obvious that all the wheels should be similarly equipped.

In removing the runners it is only necessary to spring the shoes 5 away from the tire when the runner can be immediately removed.

I claim:

A runner for vehicle wheels comprising a substantially flat body portion, an auxiliary strip secured to the upper face of the central portion of said body portion and having ends bent upwardly and inwardly, said ends being recessed, the body portion having integral upwardly curved ends and portions bent back toward one another, said bent-back portions being provided with arc-shaped shoes arranged to engage the wheel above the center thereof, said upwardly curved and back-wardly bent portions being of spring material and being adapted to be sprung apart to receive the wheel and to grip the wheel when released, said auxiliary strip being arranged to support the bottom of the wheel at the center of the strip, and the recessed ends of the auxiliary strip being arranged to engage the wheel on opposite sides of and below the center of the wheel.

ESTEN BURLEIGH BEELER.